United States Patent
Carter

(10) Patent No.: US 8,507,739 B2
(45) Date of Patent: Aug. 13, 2013

(54) METHOD FOR CONVERSION OF DISPOSABLE HYDROCARBONS INTO DIESEL AND HEATING OIL FUELS AND CONVERSION OF BIOMASS INTO BIODIESEL

(76) Inventor: Michael Carter, Cleveland, SC (US)

(*) Notice: Subject to any disclaimer, the term of this patent is extended or adjusted under 35 U.S.C. 154(b) by 526 days.

(21) Appl. No.: 12/800,372

(22) Filed: May 14, 2010

(65) Prior Publication Data

US 2011/0278200 A1 Nov. 17, 2011

Related U.S. Application Data

(63) Continuation-in-part of application No. 12/659,921, filed on Mar. 25, 2010, now abandoned.

(51) Int. Cl.
*C07C 1/00* (2006.01)
*G05B 21/00* (2006.01)

(52) U.S. Cl.
USPC ........... 585/240; 585/242; 208/401; 700/272; 700/274

(58) Field of Classification Search
USPC ......... 585/240, 242; 208/106, 401; 700/272, 700/274, 271
See application file for complete search history.

(56) References Cited

U.S. PATENT DOCUMENTS

| | | | | |
|---|---|---|---|---|
| 8,063,258 B2* | 11/2011 | Bartek et al. | ........... | 585/240 |
| 8,197,559 B2* | 6/2012 | Abe et al. | ........... | 44/398 |
| 8,217,212 B2* | 7/2012 | Paoluccio et al. | ........... | 585/242 |
| 8,318,997 B2* | 11/2012 | McAlister | ........... | 585/240 |

* cited by examiner

*Primary Examiner* — Nina Bhat
(74) *Attorney, Agent, or Firm* — Robert J. Van Der Wall

(57) ABSTRACT

The present invention is a self-powered method for conversion of disposable hydrocarbons into diesel and heating oil fuels and conversion of biomass into biodiesel fuel. The method is operated using a feedstock tank, a preparation tank for first stage warming of the feedstock, a first heat exchanger to separate out water as steam and light ends, a stack to vent steam to the atmosphere, a second heat extension to raise the temperature to the necessary for processing the feedstock in a cracking kettle, a fume incinerator burning the light ends to generate heat for the first and second heat exchangers, a distillation column to process the gases from the cracking kettle, a condenser to convert gas to liquid #2 diesel fuel, a filter and chiller unit and storage tanks to hold the fuels and residuals. The method uses retained heat in the residuals to preheat the feedstock to save energy.

5 Claims, 2 Drawing Sheets

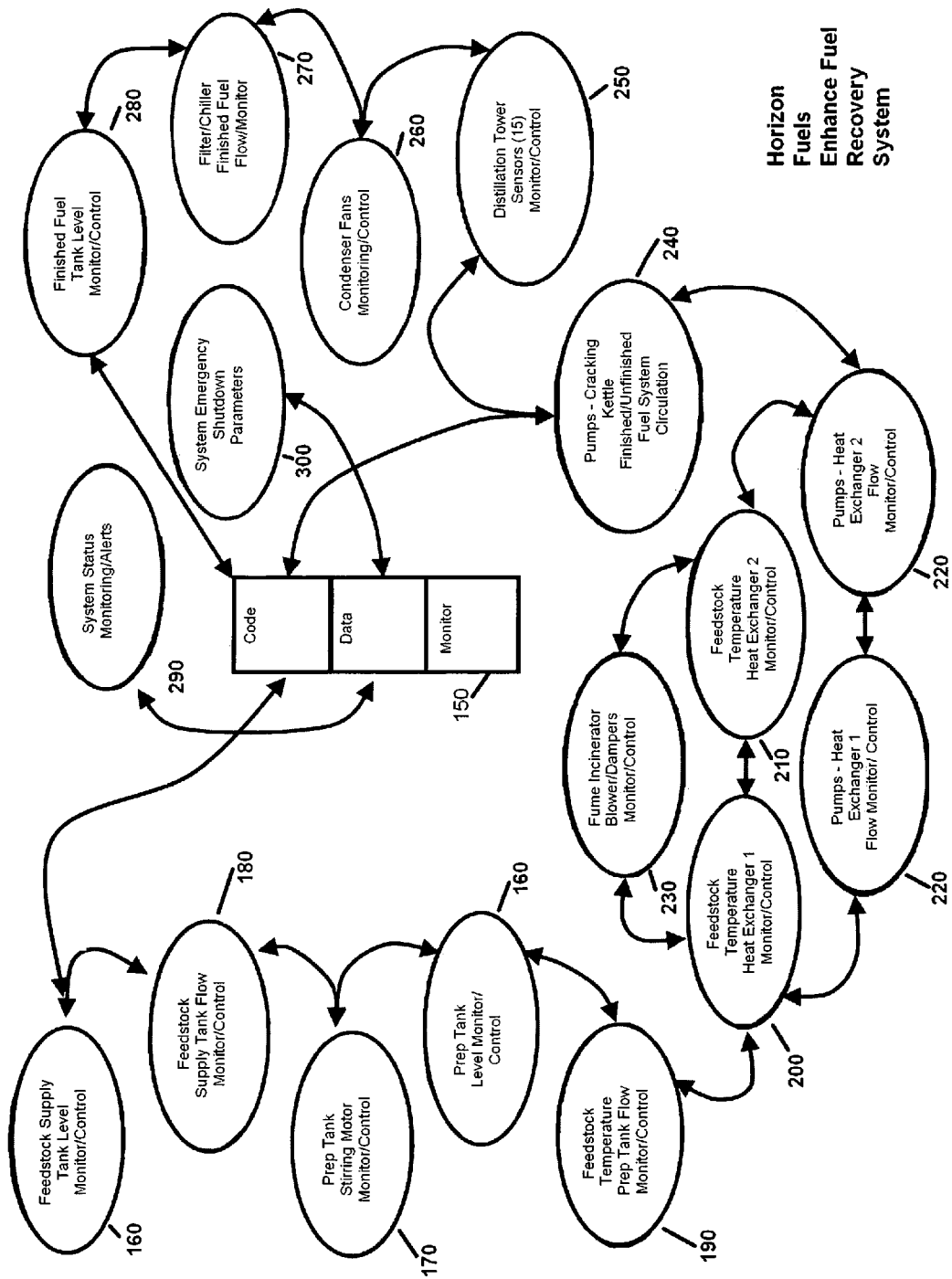

METHOD FOR CONVERSION OF DISPOSABLE HYDROCARBONS INTO DIESEL AND HEATING OIL FUELS AND CONVERSION OF BIOMASS INTO BIODIESEL

The present application is a continuation-in-part of application Ser. No. 12/659,921 filed. Mar. 25, 2010 now abandoned. It therefore claims the filing date of Mar. 25, 2010 as to the common subject matter between the parent and the continuation-in-part applications. It is also related to PCT/US11/00513. However, application Ser. No. 12/659,921 has been abandoned for failure to respond to a Non-Final Office Action mailed Aug. 3, 2012. PCT/US11/000513 has also been abandoned for failure to nationalize the application in any jurisdiction following a priority date of 25 Mar. 2010 more than thirty months ago.

BACKGROUND OF THE INVENTION

1. Field of the Invention

The present invention is an environmentally friendly ("green") invention and relates to the field of reclaiming hydrocarbons from multiple sources and processes and the processing of liquid or liquefiable biomatter to yield biodiesel. More specifically, it concerns a method and apparatus for both (1) reclaiming hydrocarbons created in the refining of crude oil, the treatment of water contaminated with oil such as from ship's bilge water, oil spills, waste motor oil, grease, paint thinner, gasoline, jet fuel, then converting them into diesel and heating oil fuels, and (2) obtaining biodiesel fuel from liquid or liquefiable biomatter such as tallow, algae, chicken fat, cooking oil and grease, palm oil, soy bean oil, etc.

2. Description of the Prior Art

It has for some time been an objective of industrialized society to conserve hydrocarbons and to reclaim waste hydrocarbons where possible. Environmental concerns and the increasing world demand for nonrenewable fuels such as oil have also driven innovation into such areas as conservation, including the reclaiming of waste hydrocarbons, and the avoidance of the dumping of environmentally damaging waste such as oily bilge water from oceangoing vessels. At the same time, the dependence of a major industrialized countries on imported oil has led to emphasis upon innovation in the development of renewable fuels such as biodiesel derived from biomass. These general prior art considerations lead to the subject matter of the present invention in multiple respects which be described under several subject headings as follows:

Refining of Crude Oil

It is estimated that between 17 and 20 percent of every barrel of refined crude oil is "residuum" or "residual" product coming off the bottom of distillation columns during the refining process in U.S. refineries. With average production of 17.6 million barrels per day over the last several years, an estimated 1.1 billion barrels (46 billion gallons) of residual/slop oils come out of U.S. refining operations annually.

The larger refineries are normally fully integrated with chemical plants, enabling the use of a full range of catalytic cracking, hydro processing, alkylation and thermal processes to optimize crude oil utilization. With their economies of scale, turning residual/slop oil into useful fuels and petroleum-based products solves logistical problems and generates significant income for large refineries.

The smaller refineries (less than 100,000 barrels per day production) that use distillation to separate gasoline fractions from crude oil usually do not have the same capabilities for re-refining their slop as the large refineries. Typically, processors and reclaimers partially clean this residual/slop oil by treating it with demulsifiers, removing water and filtering sediments. Removal of water and heavy sediments by settling and particulates by filtration are the processes most commonly used by reclaimers. The resulting product is a low-grade bunker fuel that requires several measures when in use to prevent pollution of the environment. A small percentage of this residual/slop oil is re-refined by third parties into recycled lubricants using vacuum distillation.

It is a feature of the apparatus and method of the present invention to reclaim this residual/slop oil from medium to small refineries by converting it to high value diesel and heating oil fuels. This has the advantage of decreasing the U.S. dependency on imported foreign oil by improving the yield of fuels streams from each barrel of crude refined in these operations.

Bilge Water

Ships, especially ocean going vessels, accumulate bilge water while at sea and in their cleaning when in port, which contain high concentrations of hydrocarbons. When bilge is removed from ships in port, the water must be transported from the ship to reprocessing facilities where centrifuges and filters are used to achieve a low grade bunker fuel that can be sold into the marketplace.

The expense involved in removal of bilge water from vessels has caused many shipping companies to risk dumping oil contaminated water at sea risking fines and sanctions rather than pay the ongoing cost for treatment of the bilge in port. According to recent studies, nearly a hundred million gallons of oil enter the oceans of the Earth as a result of shipping annually. These estimated amounts are probably very low as they rely on known instances of dumping of oil into the ocean to estimate the overall extent of the pollution.

It is another feature of the apparatus and method of the present invention to extract disposable hydrocarbons in bilge water in a fashion that requires limited transportation costs and higher economic return on the reclaimed fuel. The present invention provides distillation capabilities that convert these waste oils to #2 diesel and #5 heating fuel that are environmentally sound and scalable, provides economic incentives for the shipping companies to cease their dumping of bilge water at sea.

Environmental Services

It is estimated that 30 percent of oil spills occur as a result of illegal dumping or the accidental collision or grounding of vessels. The remaining 70 percent of spills occur during routine operations either offshore or at reception facilities within ports, harbors and refineries.

The toxicity of oil is significant. One gallon of oil can contaminate one million gallons of water. One quart of oil can create a two-acre oil slick. For this reason, the environmental regulatory statutes in many countries throughout the world, including the United States, require entities responsible for the introduction of oil into the ecosystem to remove the oil spills. Even relatively small oil spills must be cleaned up in the U.S. Containment and recovery equipment used to address these spills include a variety of booms, barriers, and skimmers, as well as natural and synthetic absorbent materials. Mechanical containment is used to capture and store the spilled oil until it can be disposed of properly, often in specially designed landfills.

It is another feature of the apparatus and method of the present invention to separate disposable hydrocarbons from water and other liquids using portability distillation technology that is easily transported to spill locations. This ability eliminates the need for intermediation using booms, barriers, skimmers and natural or synthetic absorbent material. It eliminates the requirement for specially designed landfills and allows the recovered hydrocarbons to be converted into marketable petrochemical products, specifically #2 diesel and #5 heating fuels.

Waste Motor Oil

Another source of hydrocarbon feedstock is waste motor oil.

Biodiesel

Ethanol made from corn requires as much energy to produce as the alleged benefits realized by its production, thus failing to reduce the U.S. dependency on foreign oil. Unlike ethanol, biodiesel provides numerous benefits in terms of energy savings and environmental safety. Biodiesel can be pumped through existing petrochemical pipeline and refueling infrastructure. Biodiesel powers existing diesel engines without modification to the engines or the fuel. As is the case with ethanol, biodiesel can be blended with standard diesel fuels. Biodiesel also is biodegradable and non-toxic, unlike petrochemicals.

However, current biodiesel distillation technology is complicated and requires additives—e.g., methanol and sulfuric acid—that create expense and certain environmental hazards. The price of methanol alone has made the cost of producing biodiesel difficult from a profitability standpoint. Furthermore, the fact that much biodiesel production relies on food crops such as corn further complicates its path to economic viability. Thus, biodiesel production to date has failed to make a meaningful impact on the U.S. dependency on foreign oil.

It is a further feature of the apparatus and method of the present invention to produce biodiesel fuel without the use of additives or catalysts and using liquid or liquefiable feedstocks that are either not derived from food crops or are discarded in any event (e.g., tallow, algae, chicken fat, cooking oil and grease, palm oil, soy bean oil, etc.). Such capability enhances the economic viability of biodiesel production providing a means to create an industry that does not require tax credits to sustain its profitability. Being able to effect such production with scalable, portable technology allows the biodiesel fuel to be produced near the source of the feedstock and/or near the distribution infrastructure required to deliver the fuel to the end user.

The present invention processes biomass such as tallow, algae, chicken fat, cooking oil and grease, palm oil, soy bean oil, etc. by setting the temperature points to the specifications of the desired fuel. For biodiesel, where the distillation curve is 335° F. to 665° F., the equipment is set for these temperatures, which results in the conversion of the feedstock to biodiesel fuel. Some hydrocarbon products have a water issue, e.g., tallow is 30-35 percent water. In such a case, the water is not separated from the feedstock at the beginning, which results in a heat loss, but this is the simplest way to control a single stream product. The invention accepts all these different feedstock components blended together, or as a single feedstock stream.

Experience with the inventive equipment has shown that regardless of whether the feedstock is waste motor oil, tank bottoms, or tallow, there is a 3 to 6 percent light gas factor that is used to provide fuel to a fume incinerator, that can be supplemented as needed with whatever in the process is available such as poor quality product, #5 heating oil, or even #2 diesel or biodiesel if necessary. Chemistry works in favor of the invention, because it is usually processing a heavy molecular chain to a light molecular chain. This results in expansion such that the invention produces more finished fuel in most cases than the quantity of feedstock at the start, despite using some of feedstock, the light ends, as fuel in the fume incinerator. Expansion is typically in the range of 3 to 10 percent.

Specific prior art in the patent field include the following references: Wansbrough et al., U.S. Pat. No. 5,885,444 ("the '444 patent"), for A Process for Converting Waste Motor Oil to Diesel Fuel and Carraway, U.S. Patent Application Publication No. 20070039249 for Process for Converting Tallow to Diesel Fuel ("the '249 application"). These references suffered a considerable number of real world problems when reduced to practice. Examples of these problems follow:

The first one was temperature spikes within the plant operating process and early stage heat requirements to reach the first process temperature level to remove water, and the disposal of same. Collectors of waste hydrocarbons (a source for feed stock) make no effort to separate the collections. A truck with a tank capacity of 2000 gallons can make 20+ stops mixing each stop with the next, then the collector will place this 2000 gallon mix with other mixes in a larger tank. Because the weight of the various hydrocarbons differ, they tend to separate and create layers with different distillation curves, oil, grease, paint thinner, gasoline, jet fuel, water, etc., the result created temperature spikes when processed which makes the plant difficult if not impossible to operate when managed by tightly controlled temperature points (+ or −5° F.) to produce a marketable product that has a specification distillation curve.

The present invention solves that problem by pre-heating and stirring the contents of the preparation tank. Pre-heating is accomplished by placing pipes in the bottom of the prep tank where retained heat is transferred/piped from the residuals and #5 fuel oil (industrial burner fuel), if any, after processing. The pre-heated feed stock is thinner to manage, and separation of hydrocarbons is avoided by stirring/mixing the tank at all times with motor driven prattles within the tank creating a constant blended product, thus avoiding temperature spikes.

The next problem was the above prior art references was with the oxidizer. The oxidizer in the '444 patent and '249 application was a design to try to resolve major odor problems such as found in a paper mill, but in this case based on the light ends. The oxidizer in the '444 and '249 references was very large with a steel tank that was filled with ceramic balls. The balls were brought to the desired temperature of 2000° F., but required a huge amount of outside fuel such as propane attempt to maintain the odor control temperature, but it was not successful. The system start-up required the use of propane with a cost up to $5000 to reach the required temperature and over 12 hours to accomplish operating levels. The '444 system when placed in operation was a costly failure. This was resolved in the present invention by replacing the oxidizer with a fume incinerator. The result is that now the fume incinerator has become is the key element to processing not only by providing the only heat source (hot air) because it produces enough heat to power the entire apparatus and method, but it is a complete solution to eliminating harmful emissions and provides complete odor control.

In the present invention the fume incinerator mixes fuel with massive amounts of air, bring that air to 2000° F.+ while at the same time within the chamber being able to dispose of water and light end hydrocarbons that were the odor source with the prior art. The light ends are destroyed by the fume incinerator, while at the same time using the light ends as fuel to heat the air and power the entire apparatus. That is, the plant is fired by light ends (plus sometimes other fuels such as #5 heating oil when necessary) produced by the process and the chamber temperature of 2000° F. can be accomplished in 30 minutes. Thus the apparatus and method require no external fuel source (after start up) and operates by producing their own fuel, even from such dilute sources as bilge water. This is a huge improvement over the prior art.

An additional problem with the above described prior art concerned the distillation column. The distillation column in the '444 patent and '249 application used nutter rings dumped in the column or random packing. As a result, the plant experienced fouling, channeling, and required high reflux ratios. The present invention solves those problems with a multi-design with trays in the lower section where fouling is more prevalent and structured packing in the upper section where lighter material exists with a distributor between the two that re-distributes the liquid improves hydraulics leading to minimzed channeling and lower reflux demands. This increases production.

The next problem in the prior art references was overheating of high temperature pumps. Operation of the plant 24/7 created stress on the seals and bearings of high temperature pumps, failure of which forced the plant offline. To avoid failure at temperatures in the range of 750° F.+ and the ability to tolerate 1000° F., in the present invention, the seals and bearings are cooled by using heat transfer oil with the transfer oil cooled quickly and recirculated back through the seals and bearings by using a condenser to disburse heat with air cooling.

The present invention includes an energy conservation design absent from the '444 patent and '249 application. Retained heat from the residuals and finished #5 heating oil is used to preheat the feed stock by circulating some of residuals and #5 heating oil thus reducing the heat load on and fuel consumption by the fume incinertor. Light ends represent an emission odor problem, but are incinerated fully in the fume incinerator to provide heat for the process, supplemented as necessary with finished #5 fuel oil. The present invention is designed to consume, incinerate and destroy those elements within the process that are either harmful to the environment or would otherwise be sent to a landfill, that have no market value. The feed stock provides the process fuel required for the system and waste hydrocarbons such as light ends are used as fuel to power the fume incinerator to provide the required process heat as hot air. In addition, the finished fuel can be used to power an onsite generator to provide all electrical power required. Simply put, the present invention fuels itself, and that is hugely different than the prior art, which consumed enormous amounts of propane and did not solve the odor and emissions problems either.

SUMMARY OF THE INVENTION

Bearing mind the foregoing, it is a principal object of the apparatus and method of the present invention to reclaim residual/slop oil from medium to small refineries by converting it to high value diesel and heating oil fuels.

It is another principal object of the apparatus and method of the present invention to extract disposable hydrocarbons in bilge water using distillation capabilities that convert these waste oils to #2 diesel and #5 heating fuel that are environmentally sound and scalable, which provides economic incentives for the shipping companies to cease their dumping of bilge water at sea.

It is an additional principal object of the apparatus and of the present invention to separate disposable hydrocarbons from water and other liquids using portability distillation technology that is easily transported to spill locations.

It is a related object of the preceding object of the apparatus and method of the present invention at spill locations to minimize the need for intermediation using booms, barriers, skimmers and natural or synthetic absorbent material.

It is an another related object of the preceding two objects of the method and apparatus of the present invention to eliminate the requirement for specially designed landfills.

It is an further related object of the preceding three objects of the apparatus and method of the present invention to allow the recovered hydrocarbons to be converted into marketable petrochemical products, specifically #2 diesel and #5 heating fuels.

It is an additional related object of the invention to properly remove water and light-end hydrocarbons at the beginning of the process to avoid the quality control problem of producing fuel that is off its specifications as to distillation curve and flash point.

It is a further principal object of the apparatus and method of the present invention to produce biodiesel without the use of additives.

It is a related object of the preceding object of the apparatus and method of the present invention to use feedstocks that are not derived from food crops (e.g., tallow, algae, chicken fat, cooking oil and grease, palm oil, soy bean oil, etc.).

It is an another related object of the preceding two objects of the apparatus and method of the present invention to enhance the economic viability of biodiesel production providing a means to create an industry that does not require tax credits to sustain its profitability.

It is an further related object of the preceding three objects of the apparatus and method of the present invention to effect such production with scalable, portable technology allowing the biodiesel to be produced near the source of the feedstock and/or near the distribution infrastructure required to deliver the fuel to the end user.

An additional and especially important object of the invention is to achieve all the foregoing objects and advantages using only fuel produced by the invention itself, thereby producing commercially saleable fuels in an environmentally clean and pollution free manner using only the byproducts of the operation of the invention to do so.

A further object of the invention is the ability to make #2 diesel and #5 heating oil with a single stream process which utilizes feedstock that is a blend of various hydrocarbons or a blend of various biomass products, as opposed to refineries which only process crude oil from a single source at a time (not mixing crude from Alaska and crude from Saudi Arabia).

Another object of the invention is to utilize a very sophisticated software that closely controls the parameters of the process and apparatus.

Other objects and advantages will be apparent to those skilled in the art.

In accordance with a principal aspect of the invention, there is provided an apparatus comprising a feed stock tank, a preparation tank for first stage heating of the feed stock, a first heat exchanger to separate out water as steam and light ends, a stack to vent steam to the atmosphere, a second heat exchanger to raise the temperature to that necessary for processing the feedstock in a cracking kettle, a fume incinerator burning the light ends to generate heat for the first and second heat exchangers, a distillation column to process the gases from the cracking kettle, the distillation column separating #2 diesel fuel from #5 fuel oil, a condenser to convert gas to liquid #2 diesel fuel, a filter and chiller unit, and storage tanks to hold #2 diesel, #5 fuel oil, and residuals. The residuals are removed from the bottom of the distillation column, at least some are circulated from the residuals storage tank back to the preparation tank to warm the feed stock from retained heat in the residuals which is then recirculated back to the residuals storage tank. All tanks are vented to the fume incinerator. The apparatus includes a closed loop control computer programmed with sophisticated software to be separately described hereinafter. When the apparatus is used with biomass to produce biodiesel, no #5 heating oil is produced, so the fuel for the fume incinerator is light ends, supplemented when necessary with low quality product or biodiesel if necessary.

The fume incinerator has multiple purposes, being an open chamber, mixing fuel with massive amounts of air, bringing that air to 2000° F.+ while at the same time within the chamber being able to dispose of water and other light end hydrocarbons. The latter were in the prior art an odor source, being destroyed by the fume incinerator of the present invention. Massive amounts of controlled heat is transferred by hot air over a heat exchanger to the feed stock which is raised to the desired temperature moving from a liquid to a gas.

In accordance with a second related aspect of the invention, there is provide a method or process wherein feed stock comprising petroleum materials, often mixed with water, or liquid biomass is converted to commercially marketable #2 diesel and #5 heating oil in a three stage heating process, although all heat emanates from the fume incinerator. The first stage is found in the prep tank. It uses retained heat in the residuals and #5 heating oil to warm the feed stock to 125° F. by circulating the residuals and #5 heating oil through piping in the prep tank. This makes use of recycled heat and reduces the fuel consumption of the process. The second stage is a first heat exchanger, which uses hot air from the fume incinerator to heat the feed stock from 125° F. to 325° F. This drives off the feed stock water and light ends. The contaminated water is converted to steam in the fume incinerator, and then the resulting steam is channeled to the atmosphere through the stack. The light ends are channeled to the fume incinerator and used as fuel to generate process heat. The third stage is a second heat exchanger which uses hot air from the fume incinerator to heat the feed stock to 650°-690° F., after which the heated feed stock is fed to the cracking kettle and distillation column.

In accordance with a third aspect of the invention, there is provided sophisticated proprietary software to control the apparatus and the method or process. It is used to monitor, configure and automate the process. This software is interactive with the operator and using subroutines to provide real time data to various parts of its program that adjust in real time to meet the desired production and yield levels. The software manages a large number of parameters all at once in real time with the software making small adjustments continuously so that everything remains a constant, or within the set ranges which are determined by the specifications of each fuel being produced in consideration of its distillation curve. Without the software, the system could not achieve the production levels, meet fuel specifications or finished fuel yields that it does. The software is accessible through a touch-screen operator interface and computer workstation.

Monitoring of the process is provided via a monitoring screen that includes a graphical depiction of the process. Touch sensitive buttons located at the bottom of the monitoring screen allow access to the motors, pumps, heat exchangers, blowers, damper, trend, alarm, and cool down components of the system. When then operator accesses each of these screens, he or she is able to monitor each critical area. The software automates the operation in each area but allows the operator overrides if desired.

The specific areas automated by the software are as follows:

(a). The Software maximizes uptime by managing the pumps and motors servicing the main feedstock and prep tank. The software monitors levels in these tanks ensuring they remain at specified levels drawing from sources of feedstock.

(b). The software activates, monitors and manages the motor at the top of the prep tank that stirs the contents of the tank.

(c). The software monitors and controls the adjustments required to maintain the temperature of the feedstock as it moves through the process. This improves stream (#2 diesel, #5 heating fuel, biodiesel) produced, allows the process to scale more effectively and ultimately limits certain byproducts from the process (e.g., coking). The areas where the feedstock temperatures and pressures are monitored and controlled include:

(i). When traveling to the supply tank and when leaving the supply tank.
(ii). When entering the prep tank and when leaving the prep tank.
(iii). When traveling from the prep tank and as it enters the first heat exchanger, while within that heat exchanger, and when it leaves that first heat exchanger.
(iv). When entering the second heat exchanger, within that heat exchanger, and when it leaves that second heat exchanger.

(d). High temperature pumps are located on a rack below the heat exchangers. The software monitors and controls the flow and thus the residence time the feedstock remains in each of the heat exchangers.

(e). The software monitors and controls the blower and the dampers attached to the fume incinerator automating the process by which percent of heated air directed into the heat exchangers and the percent of heated air directed up the stack is adjusted to provide the necessary heat to reach the temperatures required to create maximum yields of the finished product streams. The temperatures recorded by the software in the heat exchangers provide the data necessary for the software to establish the damper settings.

(f). In the cracking kettle, the software monitors and controls the temperature and the temperature pumps located on the rack below the heat exchangers to circulate the #5 heating fuel into the first heat exchanger, the prep tank and the storage tank. By monitoring and controlling the residence time of the finished and unfinished product and circulating the #5 heating fuel as energy to begin the cracking of hydrocarbon chains occurring in the first heat exchanger conserving energy throughout the process.

(g). Spread evenly throughout the distillation column are 15 sensors providing temperature data to the software that is used by the software to control the distillation curve to maximize the yield of #2 diesel fuel leaving the top of the tower and entering the condenser.

(h). The software monitors and controls the fans in the condenser to maximize the speed at which the #2 diesel entering the condenser at 650° F. can be condensed from gas to a liquid that leaves the condenser at 350° F.

(i). The software controls the pump flow of the #2 diesel from the condenser to the filter/chiller by monitoring the temperatures in the filter/chiller to ensure the resident time necessary to maximize the extraction of any remaining particulates or matter that is undesirable (e.g., sulfur).

(j). If any functions within the process fail to respond within tolerances to the controls and commands from the software programs, alarms notify that direct operator intervention is required. Often such alarms may be address through further manipulation of the software through a keyboard interface.

(k). If catastrophic failure were to occur within the system, the software notifies and works in support of the automated fire suppression system to accelerate shut down process.

BRIEF DESCRIPTION OF THE DRAWINGS

Various other features of the invention will become apparent to those skilled in the art from the following discussion taken in conjunction with the appended drawings, in which:

FIG. 2 is a flow diagram showing the interaction of the proprietary software with the process aspects of the invention.

DETAILED DESCRIPTION OF THE PREFERRED EMBODIMENTS

Figure 1:
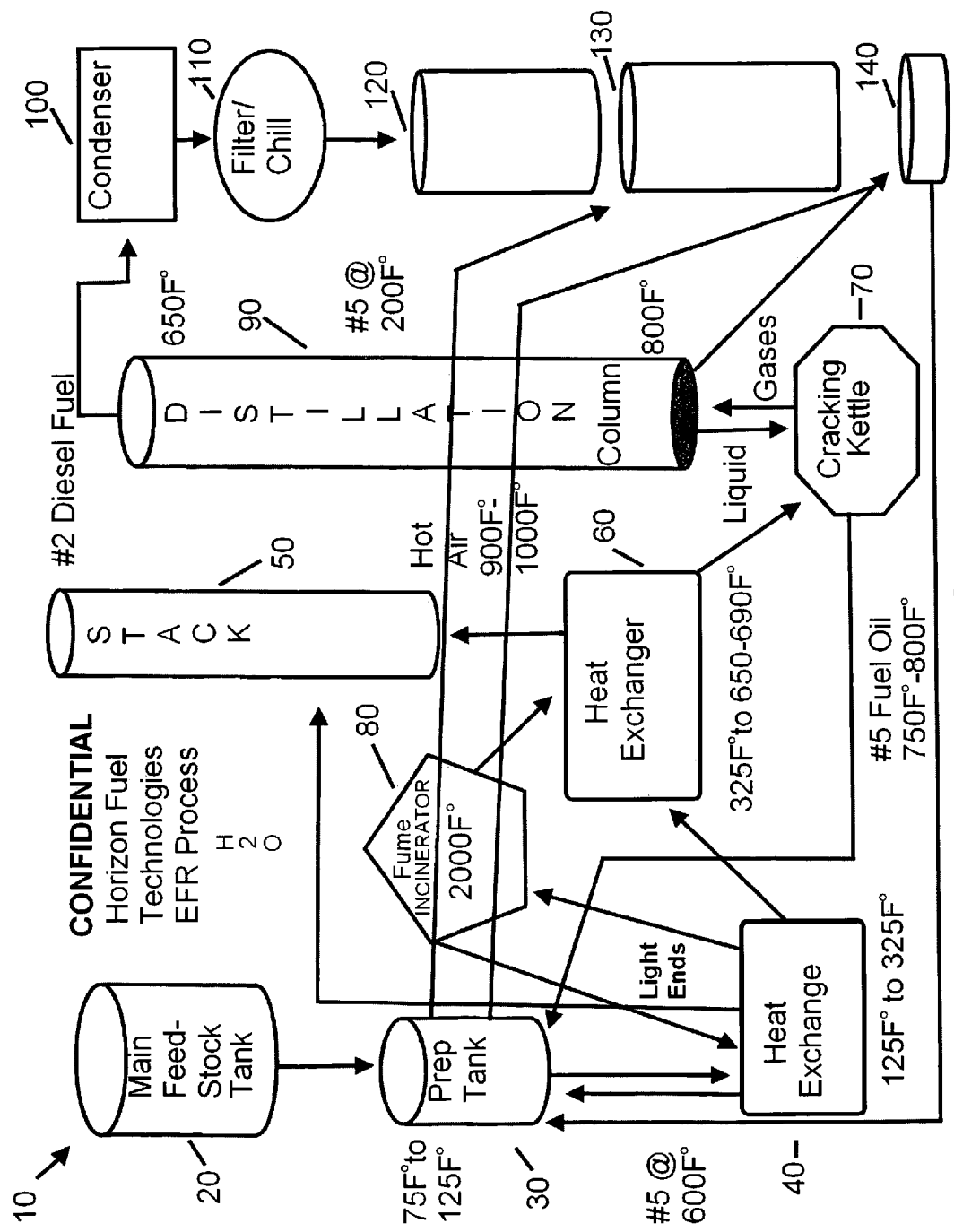
FIG. 1 is a schematic drawing of the principal components of the inventive apparatus, and also showing the movement of feed stock, heat flow, by-products, finished product and emissions through the apparatus.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for claims to be later appended and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

Turning first to FIG. 1, the principal components of the apparatus 10 comprise a feed stock tank 20, a preparation tank 30 for first stage heating of the feed stock, a first heat exchanger 40 to separate out water as steam and light ends, a stack 50 to vent steam and air to the atmosphere, a second heat exchanger 60 to raise the temperature to that which is necessary for processing the feedstock in a cracking kettle 70, a fume incinerator 80 burning the light ends to generate heat for the first and second heat exchangers 40,60, a distillation column 90 to process the gases from the cracking kettle 70, the distillation column 90 separating #2 diesel fuel as a gas from #5 fuel oil as a liquid, a condenser 100 to convert gas to liquid #2 diesel fuel, a filter and chiller unit 110, and storage tanks 120, 130 and 140 respectively to hold #2 diesel, #5 fuel oil, and residuals. The residuals are removed from the bottom of the distillation column 90 and directed to the residuals storage tank 140, but at least some are recirculated from the residuals storage tank 140 back to the preparation tank 30 to warm the feed stock from retained heat in the residuals. After that it is then recirculated back to the residuals storage tank 140. Also, some of the #5 fuel oil is recirculated back from the cracking kettle 70 to the preparation tank 30 to use its retained heat to assist in warming the feed stock. After surrendering most of its retained heat in passing through the preparation tank 30, this portion of the #5 fuel oil is recirculated back to the fuel oil storage tank 130. Inside the prep tank 30 are fin tube pipes that contain the recirculated residuals and #5 fuel oil. Those are in a temperature range of 500° F. to 700° F. The fin tube pipes are in the bottom of the prep tank 30 below 10 feet. The prep tank 30 includes interior paddles to maintain relatively even temperature in the prep tank 30 and extract more efficiently the heat from the fin tube pipes. The paddles are driven by a motor on the top of the prep tank 30. The oil from the prep tank 30 is drawn from a level of 10 feet above the bottom of the prep tank 30, just above the tubes and the paddles.

Sometimes the source of the feed stock results in it containing a significant amount of sulfur as a contaminant. Any such sulfur contained in the feed stock is reduced by 80 percent passing through the distillation column 90. However, depending on the amount of sulfur in the feed stock at the start of the processing, the remaining sulfur may be considered too high. An additional function of the filter and chiller unit 110 then is to chill the finished product #2 diesel fuel coming off the top of the distillation column 90 to a temperature of 0° F., injected with air, and filtered to further reduce the level of sulfur by an additional 70 to 80 percent.

The fume incinerator 80 has multiple purposes, being an open chamber, mixing fuel with massive amounts of air, bring that air to 2000° F.+ while at the same time within the chamber being able to dispose of water and other light end hydrocarbons. The latter were, in the prior art, an odor source. However, in the present invention they are scrubbed from the emissions by being consumed in the fume incinerator 80. The volume of flow of hot air produced in the fume incinerator 80 is controlled by dampers. The hot air passing the dampers is directed over finned tubes in the two heat exchangers 40, 60. The dampers have the option of sending hot air into each of the heat exchangers 40, 60 or sending the hot air to the stack 50. After passing over the finned tubes of the heat exchangers and surrendering most of its heat thereto, the air is directed to the stack 50.

While the foregoing describes the primary components of the inventive apparatus, the present invention obviously requires many secondary components to operate in practice. These include such items as pumps, blowers or fans, air flow dampers, temperature and fluid level sensors, timers, fluid flow meters, piping, air flow ducting, readout devices of various types, and a plethora of other equipment, some of which must be provided with standby duplicates in the event of equipment failure. These secondary components are clearly contemplated as a part of the present invention, but are not deemed inventively significant enough to require a detailed description in this non-provisional utility patent application.

With the exception of the pumps associated with a tank farm which pump feedstock from truck to tank, tank to tank, and supply tank to prep tank, all other pumps are located within the plant such as on a rack with all pumps in a row. This renders them very easy to service, with good heat distribution away from the pumps, air circulation, with the backup for each unit sitting beside the primary pump in use. The apparatus further includes a closed loop control computer programmed with sophisticated software to be separately described hereinafter in regard to FIG. 2.

The method or process aspect of the invention comprises a series of steps wherein feed stock including petroleum materials, often mixed with water, or alternatively liquid biomass, is converted to commercially marketable #2 diesel and #5 heating oil in a three stage heating process, although all heat emanates from the fume incinerator.

The first stage is preheating the feed stock in the prep tank 30. It uses retained heat in the residuals and #5 heating oil to warm the feed stock to at least 125° F. by circulating the residuals and #5 heating oil through piping in the prep tank 30. Actually, the prep tank temperature may reach about 200° F. or more since the objective is to keep the prep tank as hot as achievable from the recirculated residuals and the #5 fuel oil, to reduce fuel costs. This makes use of recycled heat and reduces the fuel consumption of the process.

The second stage of the heating process in achieved is a first heat exchanger 40, which uses as a primary source of heat the #5 fuel oil that is pumped off the bottom of the cracking kettle 70 at a temperature of 790° F.+. To the extent necessary, the first heat exchanger 40 also uses as a source of heat hot air from the fume incinerator 80. After passing through the first heat exchanger 40 the #5 fuel oil travels to the bottom of the prep tank as described above. The first heat exchanger 40 heats the feed stock from 125° F.+ to 325° F. This drives off from the feed stock water and light ends which are channeled to the fume incinerator. The resulting stream is then channeled to the atmosphere through the stack 50. The light ends are channeled to the fume incinerator 80 and used as fuel to generate process heat.

The third stage of the heating process is a second heat exchanger 60 which uses hot air from the fume incinerator 80 to heat the feed stock to 650°-690° F., after which the heated feed stock is fed to the cracking kettle 70 and distillation column 90.

Another aspect of the invention is the sophisticated proprietary software used to monitor and to control the apparatus and the method or process. The software controls three basic things; 1) heat within the system, 2) pressure, 3) fume incinerator oxygen and fuel. It is used to monitor, configure and automate the process. This software is interactive with the operator and uses subroutines to provide real time data to various parts of its program that adjust in real time to meet the desired production specs and yield levels. The software monitors and controls a large number of parameters all at once in real time with the software making small adjustments continuously so that everything remains a constant, or within the set ranges which are determined by the specifications of each fuel being produced in consideration of its distillation curve. Without the software, the system could not achieve the production levels or finished fuel yields it does. The software is accessible through a touch-screen operator interface and computer workstation.

Monitoring of the process is provided via a monitoring screen that includes a graphical depiction of the process. Touch sensitive buttons located at the bottom of the monitoring screen allow access to the motors, pumps, heat exchangers, blowers, dampers, trend, alarm, and cool down components of the system. When the operator accesses each of these screens, he or she is able to monitor each critical area. The software automates the operation in each area but allows the operator overrides if desired.

The specific areas automated by the software are as follows:

(a). The Software maximizes uptime by managing the pumps and motors servicing the main feedstock tank 20 and prep tank 30. The software monitors levels in these tanks ensuring they remain at specified levels drawing from the source of feedstock.

(b). The software activates, monitors and manages the motor at the top of the prep tank 30 that stirs the contents of the tank.

(c). The software monitors and controls the adjustments required to maintain the temperature of the feedstock as it moves through the process. This improves stream (#2 diesel, #5 heating fuel, biodiesel) produced, allows the process to scale more effectively and ultimately limits certain byproducts from the process (e.g., coking). The areas where the feedstock temperatures are monitored and controlled include:

(i). When traveling to the main feed stock tank 20 and when leaving the main feed stock tank 20.

(ii). When entering the prep tank 30 and when leaving the prep tank 30.

(iii). When it enters the first heat exchanger 40, while within that heat exchanger 40, and when it leaves that first heat exchanger 40.

(iv). When entering the second heat exchanger 60, within that heat exchanger 60, and when it leaves that second heat exchanger 60.

(d). High temperature pumps are located on a rack below the heat exchangers. The software monitors and controls the flow and thus the residence time the feed stock remains in each of the heat exchangers.

(e). The software monitors and controls the blower and the dampers attached to the fume incinerator automating the process by which percent of heated air directed into each of the heat exchangers 40, 60 and the percent of heated air directed up the stack 50 is adjusted to provide the necessary heat to reach the temperatures required to create maximum yields of the finished product streams. The temperatures recorded by the software in the heat exchangers 40, 60 provide the data necessary for the software to establish the damper settings.

(f). In the cracking kettle 70, the software monitors and controls the temperature and the temperature pumps located on the rack below the heat exchangers to circulate the #5 heating fuel into the first heat exchanger 40, the prep tank 30 and the storage tank 130. By monitoring and controlling the residence time of the finished and unfinished product and circulating the #5 heating fuel as energy to begin the cracking of hydrocarbon chains occurring in the first heat exchanger 40 conserving energy throughout the process. The software also checks the pressure in the cracking kettle 70. The controls are set such that if the pressure exceeds the control level the software opens a relief valve which lowers the pressure by sending gas/oil back to feed stock tank 20.

(g). Spread evenly throughout the distillation column 90 are 15 sensors providing temperature data to the software that is used by the software to control the distillation curve to maximize the yield of #2 diesel fuel leaving the top of the distillation column 90 and entering the condenser 100.

(h). The software monitors and controls the fans in the condenser 100 to maximize the speed at which the #2 diesel entering the condenser at 650° F. can be condensed from gas to a liquid that leaves the condenser at 350° F.

(i). The software controls the pump flow of the #2 diesel from the condenser 100 to the filter/chiller 110 by monitoring the temperatures in the filter/chiller 110 to ensure the residence time necessary to maximize the extraction of any remaining particulates or matter that is undesirable (e.g., sulfur).

(j). If any functions within the process fail to respond within tolerances to the controls and commands from the software programs, alarms indicate when direct operator intervention is required. Often such alarms may be addressed through further manipulation of the software through a keyboard interface.

(k). If catastrophic failure were to occur within the system, the software notifies and works in support of the automated fire suppression system and accelerates the shut down process.

We turn now to FIG. 2, which is a flow diagram of above described software. The description of this flow diagram follows. This software is used to monitor, configure and automate the process. This software is interactive with the operator and using subroutines to provide real time data to various parts of its program that adjust in real time to meet the desired production and yield levels.

Without the software, the system could not achieve the production levels or finished fuel yields it does. The software is accessible through a touch-screen operator interface and computer workstation.

Monitoring of the process is provided via a monitoring screen 150 that includes a graphical depiction of the process. Touch sensitive buttons located at the bottom of the monitoring screen allow access to the motors, pumps, heat exchangers, blowers, damper, trend, alarm and cool down components of the system. When the operator accesses each of these screens, he is able to monitor each critical area. The software automates the operation in each area but allows the operator overrides if desired.

The software maximizes uptime by managing at 160 the pumps and motors servicing the main feedstock and prep tank. The software monitors at 160 levels in these tanks ensuring they remain at specified levels drawing from sources of feedstock.

The software activates, monitors and manages at 170 the motor at the top of the prep tank that stirs the contents of the tank.

The software monitors and makes the adjustments at 180 required to maintain the temperature of the feedstock as it moves through the process. This improves the yields for each finished fuel stream (#2 diesel, #5 heating fuel, biodiesel) produced, allows the process to scale more effectively and ultimately limits certain byproducts from the process (e.g., coking).

The areas where the feedstock temperatures are monitored and controlled by the software include:

(a) when traveling to the supply tank and when leaving the supply tank at 180;

(b) when entering the prep tank and when leaving the prep tank at 190;

(c) when traveling from the prep tank and as it enters the first heat exchanger, while within the heat exchanger and when it leaves the heat exchanger at 200; and (d) when entering the second heat exchanger, within the heat exchanger and when it leaves the second heat exchanger.

High temperature pumps are located on a rack below both heat exchangers. The software monitors and controls at 220 the flow and thus the residence time the feedstock remains in the heat exchangers.

The software monitors and controls at 230 the blower and the dampers attached to the fume incinerator automating the process by which the percent of heated air directed into the heat exchangers and the percent of heated air directed up the stack is adjusted to provide the necessary heat to reach the temperatures required to create maximum yields of the finished product streams. The temperatures recorded by the software in the heat exchangers provide the data necessary for the software to establish the damper settings.

In the cracking kettle, the software monitors and controls at 240 the temperature and the residence time of the finished and unfinished product in the cracking kettle using the high temperature pumps located on the rack below the heat exchangers to circulate the #5 heating fuel into the heat exchangers, the prep tank and the storage tank. By monitoring and controlling at 240 the residence time of the finished and unfinished product and circulating the #5 heating fuel to the heat exchanger and prep tank, the software uses the heat from the process captured in the #5 heating fuel as energy to begin the cracking of hydrocarbon chains occurring in the heat exchanger perpetuating the value of the energy throughout the process.

Spread evenly throughout the distillation column 90 are 15 sensors providing temperature data at 250 to the software that is used by the software to control the distillation curve to maximize the yield of #2 diesel fuel leaving the top of the tower and entering the condenser.

The software monitors and controls at 260 the fans in the condenser to maximize the speed at which the #2 diesel entering the condenser at 650 degrees F. can be condensed from gas to a liquid that leaves the condenser at 350° F.

The software controls the pump flow of the #2 diesel from the condenser to the filter/chiller by monitoring at 270 the temperatures in the filter/chiller to ensure the residence time necessary to maximize the extraction of any remaining particulates or matter that is undesirable (e.g., sulfur).

The software monitors at 280 levels in the finished fuel tanks.

If any functions within the process fail to respond within tolerances to the controls and commands from the software programs, alarms at 290 notify that direct operator intervention is required. Often such alarms may be address through further manipulation of the software through a keyboard interface.

If catastrophic failure occurs within the system, the software notifies and works in support of the automated fire suppression system to accelerate shut down process at 300.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims appended hereto.

What is claimed is:

1. A self powered method of conversion of disposable hydrocarbons into diesel and heating oil fuels and for conversion of biomass into biodiesel fuel in a three stage heating process comprising:

drawing feedstock from a feedstock tank into a preparation tank;

preheating the feedstock in the preparation tank to save energy using retained heat in the residuals and #5 heating oil, if any, to warm the feed stock to 125° F. by circulating the residuals and #5 heating oil, if any, through piping in the preparation tank as first and second liquid to liquid heat exchangers;

heating the feedstock in a first hot air heat exchanger to drive off light ends and water as steam, which steam is vented by a stack to the atmosphere;

heating the feedstock in a second hot air heat exchanger to processing temperature;

processing the feedstock in a cracking kettle to produce gaseous #2 diesel and #5 heating oil or biodiesel;

incinerating light ends, and if necessary to obtain sufficient heat inferior product and #5 heating oil, if any, or biodiesel to generate heat for the process including especially the first and second hot air heat exchangers;

separating the gaseous #2 diesel and #5 heating oil exiting the cracking kettle in a distillation column;

converting gaseous #2 diesel fuel to liquid #2 diesel fuel in a condenser;

removing particulates and sulfur and lower product temperatures in a filter and chiller unit;

storing #2 diesel and #5 fuel oil or biodiesel, and residuals removed from a bottom of the distillation column in storage tanks; and monitoring, configuring, and automating operation of the method using a closed loop control computer programmed with sophisticated software.

2. The method of claim 1 using recycled heat and reducing the fuel consumption of the three stage heating process in which the first stage is preheating the feedstock; the second stage is heating the feedstock from 125° F. to 325° F. driving off from the feedstock water in the form of steam and light ends in a first hot air heat exchanger using hot air from a fume incinerator; channeling the steam to the atmosphere through a stack; channeling the light ends to the fume incinerator; using the light ends as fuel to generate process heat in the fume incinerator; while the third stage is heating the feedstock less water and light ends to 650°-690° F. in a second hot air heat exchanger which also uses hot air from the fume incinerator; and feeding the heated feed stock to a cracking kettle and a distillation column.

3. The method of claim 1 in which the touch screen computer and software are interactive with an apparatus operator and using subroutines to provide real time data to various parts of the program that are adjusting in real time to meet desired production and yield levels.

4. The method of claim 1 in which the software is using a large number of parameters all at once in real time making small adjustments continuously so that everything remains within set ranges which are determined by specifications of each fuel being produced in consideration of each fuel's distillation curve.

5. The method of claim 1 in which the software is automating the following:
  (a). maximizing uptime by managing the pumps and motors servicing the main feedstock and prep tank, monitoring levels in these tanks ensuring they remain at specified levels drawing from sources of feedstock;
  (b). activating, monitoring and managing the motor at the top of the prep tank that stirs contents of the tank;
  (c). monitoring and controlling adjustments required to maintain temperature of the feedstock as it moves through the apparatus including:
    (i). when entering to the feedstock tank and when leaving it;
    (ii). when entering the prep tank and when leaving it;
    (iii). when entering the first hot air heat exchanger, within that heat exchanger, and when leaving it;
    (iv). when entering the second hot air heat exchanger, within that heat exchanger, and when leaving it;
  (d). monitoring and controlling the flow and thus the residence time the feedstock remains in each of the heat exchangers using controls to the high temperature pumps located on a rack below the heat exchangers;
  (e). monitoring and controlling a blower and dampers attached to the fume incinerator automating the process by which percent of heated air directed into the hot air heat exchangers and the percent of heated air directed up the stack is adjusted to provide necessary heat to reach temperatures required to create maximum yields of finished product streams, temperatures recorded by the software in the heat exchangers providing data necessary for the software to establish damper settings;
  (f). monitoring and controlling temperature in the cracking kettle;
  (g). monitoring and controlling the high temperature pumps located on the rack below the heat exchangers to adjust residence time of the unfinished product through each part of the apparatus;
  (h). monitoring each of fifteen (15) sensors spread evenly throughout the distillation column providing temperature data to the software that is used by the software for controlling the distillation curve to maximize yield of #2 diesel or biodiesel fuel leaving the top of the tower and entering the condenser;
  (i). monitoring and controlling fans in the condenser to maximize speed at which the #2 diesel entering the condenser at 650° F. can be condensed from gas to a liquid that leaves the condenser at 350° F.;
  (j). controlling pump flow of the #2 diesel from the condenser to the filter/chiller by monitoring temperatures in the filter/chiller to ensure residence time necessary to maximize extraction of any remaining particulates or matter that is undesirable such as sulfur;
  (k). if any functions within the apparatus fail to respond within tolerances to controls and commands from the software, alarms notifying that direct operator intervention is required such as when such alarms may be addressed through manipulation of the software through a keyboard interface; and
  (l). if catastrophic failure occurs, the software notifying and works in support of an automated fire suppression system to accelerate shut down process.

* * * * *